UNITED STATES PATENT OFFICE.

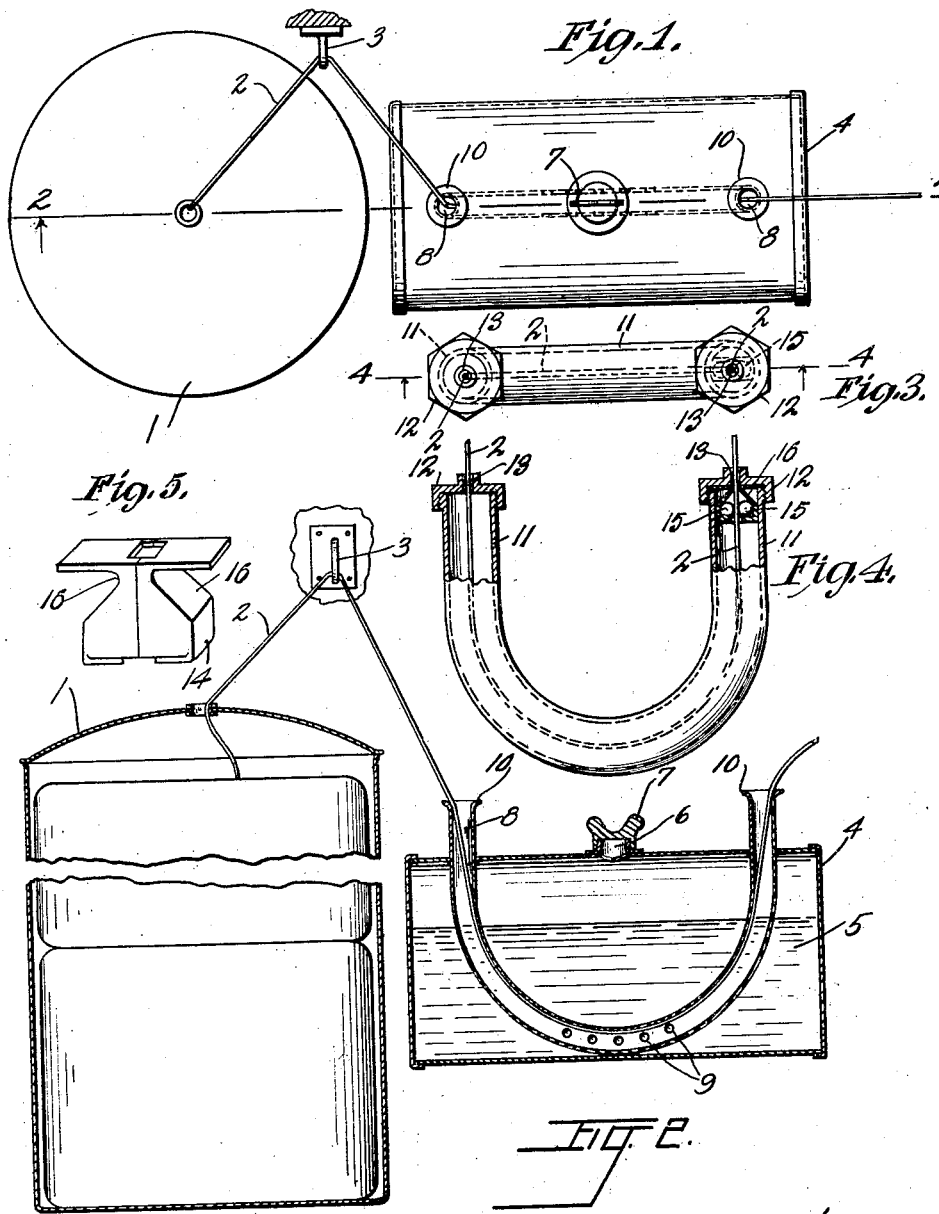

WILLIAM HEUER, OF WONEWOC, WISCONSIN.

TWINE-OILER.

1,269,604.  Specification of Letters Patent.  Patented June 18, 1918.

Application filed April 12, 1916. Serial No. 90,667.

*To all whom it may concern:*

Be it known that I, WILLIAM HEUER, a citizen of the United States, residing at Wonewoc, in the county of Juneau, in the State of Wisconsin, have invented certain new and useful Improvements in Twine-Oilers, of which the following is a specification.

This invention relates to improvements in twine oilers for reapers and its object is to provide means to be attached to selfbinding reapers whereby the twine used in binding the sheaves may be saturated with a fluid or semi-fluid substance to prevent insects and field mice from eating the twine and severing the bands. The oiler is adapted to be attached to the reaper between the twine box and the needle in such manner that the twine will pass through it on the way from the box to the needle.

With the foregoing and other objects in view the invention consists in the combination and arrangement of parts to be hereinafter fully described in the following specification, pointed out in the appended claims and illustrated in the accompanying drawings which form a part of said specification and in which—

Figure 1 is a top plan view of my twine oiler and of the twine box showing their preferred relative positions.

Fig. 2 is a vertical sectional view on line 2—2 of Fig. 1.

Fig. 3 is a top plan view of a slightly modified form of oiler.

Fig. 4 is a view taken on line 4—4 of Fig. 3.

Fig. 5 is a perspective view of the ball bearing box employed.

Like reference characters denote corresponding parts throughout the several views.

The numeral 1 denotes the ordinary twine box and 2 the twine and 3 a guide bracket for the twine which is secured to the reaper in any convenient manner. My oiler proper comprises a container 4 suitably secured to the reaper and adapted to contain the fluid or semi-fluid twine-saturating substance 5 which is introduced into the container through the orifice 6 provided with the cap 7. An approximately U-shaped twine tube 8 is carried by and mainly disposed within the container 4, part of the interior of said tube being formed with perforations 9 and the ends of said tube being extended beyond the container and flared as at 10, 10. The twine passes from the guide bracket into one end of the tube 8 and through the same and out the opposite end and to the needle (not shown). The lubricant in the container filters into the tube 8 through the perforations 9 and coats the twine.

In Figs. 3, 4 and 5 a tube 11 is substituted for the tube 8 and container 4 just described. The tube 11 is substantially U-shaped and adapted to be secured to the reaper in a suitable manner between the twine box and needle and to contain the fluid 5. Each end of the tube 11 is provided with a screw cap 12 which is formed with a central perforation 13 to permit passage of the twine 2. The end of the tube 11 nearest the needle is provided with a box 14 wherein balls 15 are disposed and said box is formed with a contracted neck 16 adjacent the cap 12. The twine, after being saturated in the tube 11, passes out through suitable perforations in the box 14 and in passing through the box is brought into frictional engagement with the balls 15 which tend to remove any surplus lubricant and to distribute the same in a uniform manner over the twine.

What is claimed is:—

1. In a twine oiler, a substantially U-shaped liquid container, centrally perforated screw caps for the end of said container, an apertured box formed with a flanged end adapted to rest upon one end of said liquid container and to be frictionally secured thereto by one of said perforated screw caps, said apertured box being formed with a contracted neck portion, and balls arranged in said box below said neck portion.

2. In a twine oiler, a substantially U-shaped liquid container, centrally perforated screw caps for the ends of said container, a box formed with a contracted neck carried at one end of said container and balls arranged within said box.

In testimony that I claim the foregoing as my own I have hereto affixed my signature in the presence of two subscribing witnesses.

WILLIAM HEUER.

Witnesses:
 E. M. HANZLIK,
 E. W. FOERSTER.

Copies of this patent may be obtained for five cents each, by addressing the "Commissioner of Patents, Washington, D. C."